United States Patent  (10) Patent No.: US 8,967,346 B2
Polakowski et al.  (45) Date of Patent: Mar. 3, 2015

(54) MULTI-STAGE TELESCOPIC SHOCK ABSORBER

(75) Inventors: Stephen E. Polakowski, Atlantic Mine, MI (US); Christian Michael Muehlfeld, Chassell, MI (US); Steven Mattson, Houghton, MI (US); David Labyak, Hancock, MI (US)

(73) Assignee: Great Lakes Sound & Vibration, Inc., Houghton, MI (US)

( * ) Notice: Subject to any disclaimer, the term of this patent is extended or adjusted under 35 U.S.C. 154(b) by 847 days.

(21) Appl. No.: 12/904,696

(22) Filed: Oct. 14, 2010

(65) Prior Publication Data

US 2011/0101579 A1  May 5, 2011

Related U.S. Application Data

(60) Provisional application No. 61/256,800, filed on Oct. 30, 2009.

(51) Int. Cl.
*F16F 9/22* (2006.01)
*B60G 15/12* (2006.01)
*F16F 9/06* (2006.01)
*F16F 9/16* (2006.01)
*F16F 9/32* (2006.01)

(52) U.S. Cl.
CPC .............. *B60G 15/12* (2013.01); *F16F 9/063* (2013.01); *F16F 9/165* (2013.01); *F16F 9/3228* (2013.01); *F16F 9/3235* (2013.01); *F16F 9/3242* (2013.01); *B60G 2202/152* (2013.01); *B60G 2202/24* (2013.01)
USPC ....................................... 188/297; 267/64.26

(58) Field of Classification Search
USPC ............ 188/297, 313, 316, 317, 322.19, 315; 267/64.26
See application file for complete search history.

(56) References Cited

U.S. PATENT DOCUMENTS

| 2,379,388 | A | * | 6/1945 | Thornhill | 267/64.15 |
| 3,250,526 | A | * | 5/1966 | Kress | 267/64.16 |
| 3,363,894 | A | * | 1/1968 | Hill | 267/64.15 |
| 4,079,924 | A | | 3/1978 | Persicke | |
| 4,428,567 | A | * | 1/1984 | Fournales | 267/64.26 |
| 5,178,239 | A | | 1/1993 | Homme | |
| 5,664,649 | A | | 9/1997 | Thompson et al. | |
| 6,343,677 | B2 | | 2/2002 | Bell | |
| 6,659,241 | B2 | | 12/2003 | Sendrea | |
| 2003/0094341 | A1 | | 5/2003 | Lemieux | |
| 2004/0094376 | A1 | | 5/2004 | van Wonderen et al. | |

(Continued)

OTHER PUBLICATIONS

Air 2.0 Service Procedures, RydeFX Pro Series, Ride Control, LLC, Copyright 2009, 17 pages, http://rydefx2.com/air2files/pdfs/Air2_0_Service_R_Eng.pdf, last visited Jun. 11, 2012.

(Continued)

*Primary Examiner* — Robert A Siconolfi
*Assistant Examiner* — Vu Q Nguyen
(74) *Attorney, Agent, or Firm* — Andrus Intellectual Property Law, LLP

(57) ABSTRACT

A multi-stage shock absorber with closed ends has a plurality of tubular shock bodies telescopically interconnected together, and includes a piston arrangement slidably mounted within certain of the shock bodies to define a number of chambers variously containing damping and/or spring elements for enabling damping of shock forces applied to the shock absorber.

28 Claims, 7 Drawing Sheets

(56) References Cited

U.S. PATENT DOCUMENTS

| | | |
|---|---|---|
| 2005/0034942 A1* | 2/2005 | Bugaj .................. 188/297 |
| 2011/0187076 A1 | 8/2011 | Gonzalez et al. |
| 2011/0221108 A1 | 9/2011 | Uchiyama |
| 2011/0296981 A1 | 12/2011 | Chou |

OTHER PUBLICATIONS

Air 2.0 RydeFX High Performance Shocks, Ride Control, LLC, Copyright 2009, 1 page, http://rydefx2.com/air2.aspx, last visited Jun. 11, 2012.

Article by Fred Williams entitled "Air Shock Technical—Air Shocks 4 Rocks—Pros and Cons of Air Shocks", 4Wheel & Off-Road Magazine, Feb. 2009 Issue; available at http://www.4wheeloffroad.com/techarticles/suspension/131_0606_air_shock_technical/ind . . . , pp. 1-5, last visited Apr. 23, 2010.

Article by Andy Swanson entitled "An Inside Look at Gerard Karpik's Snowmobile Air Shock Technology", SnowGoer Magazine; available at http://www.snowgoer.com/output.cfm?id=2456605, pp. 1-4, last visited Apr. 23, 2010.

* cited by examiner

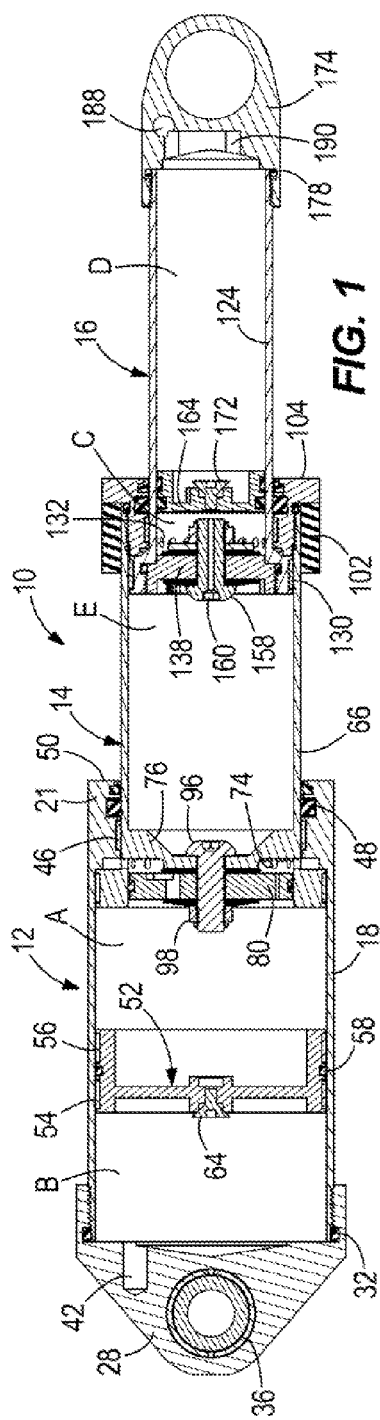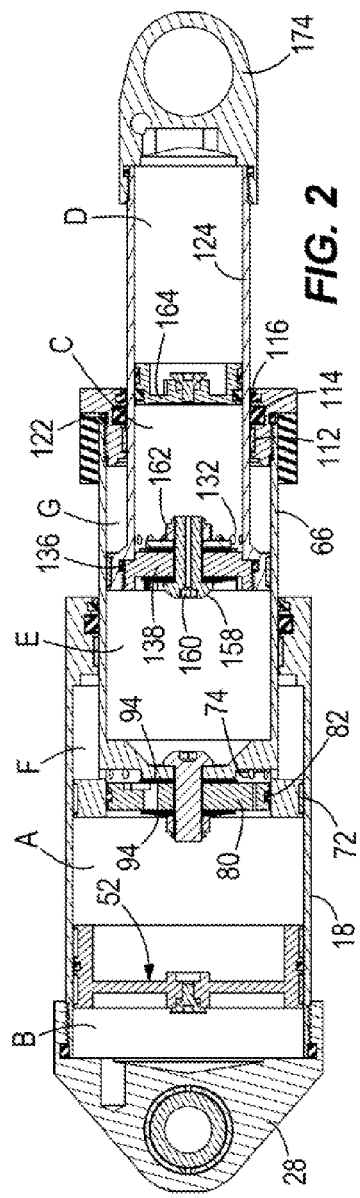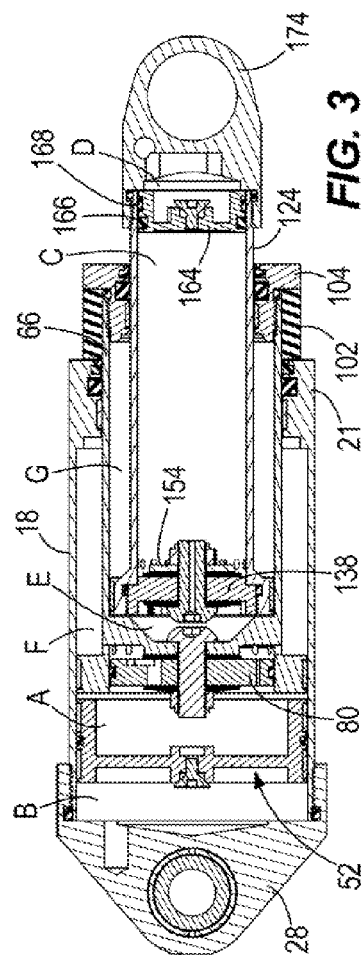

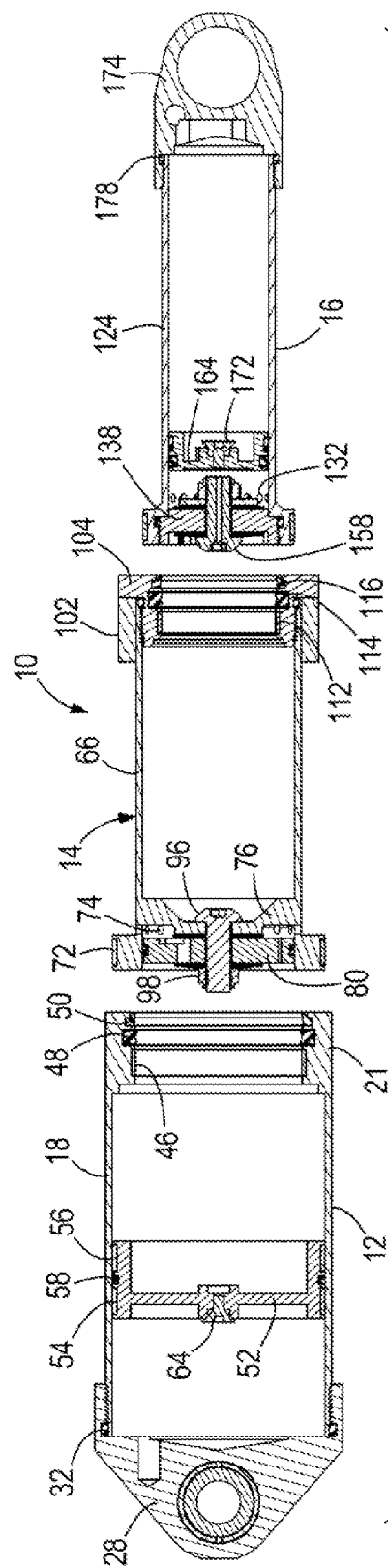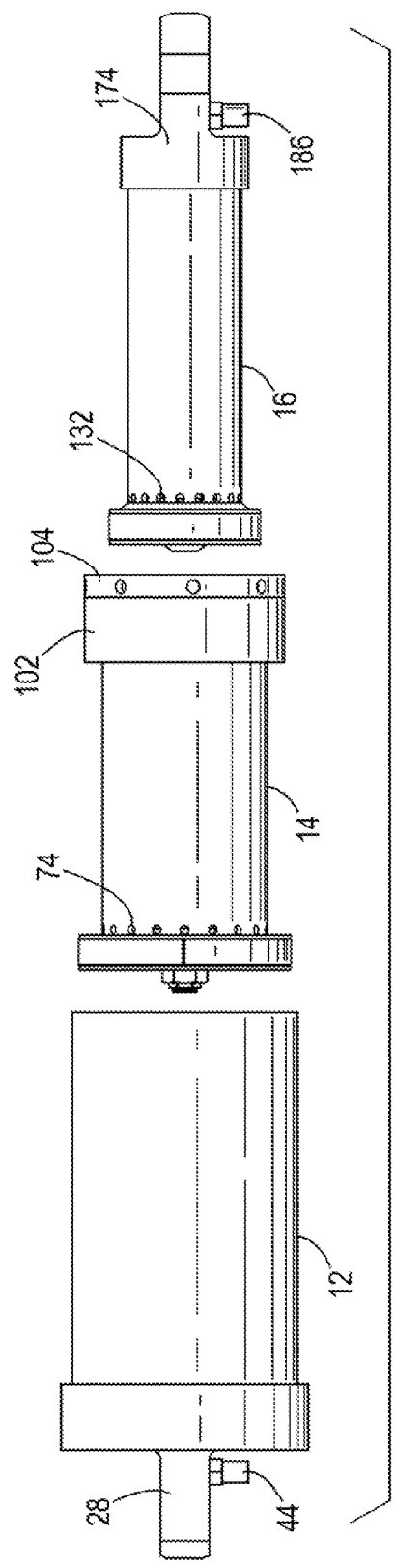

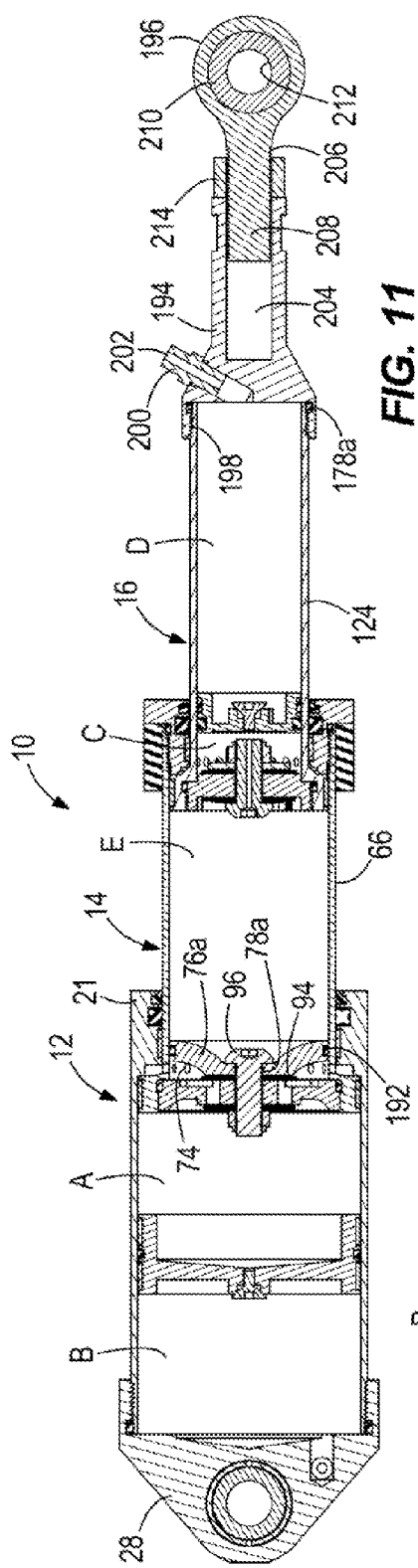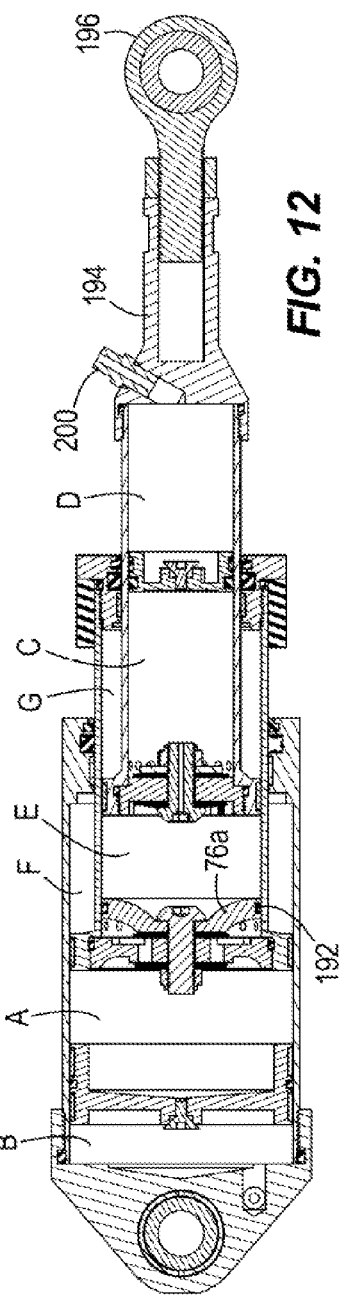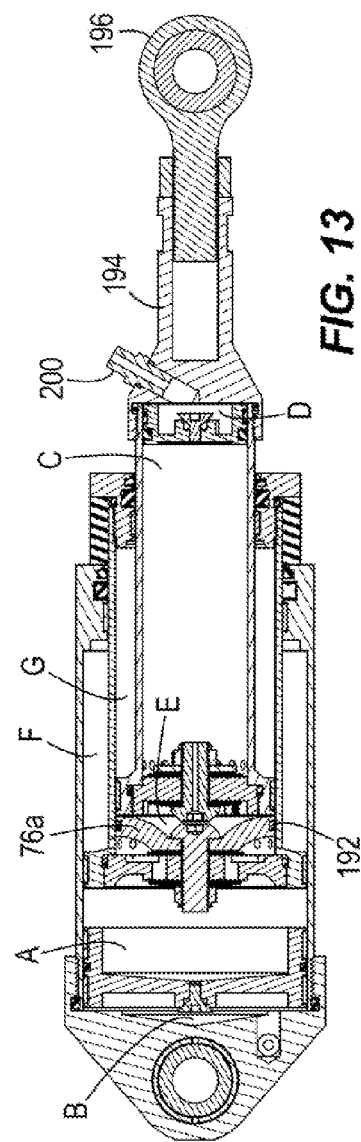

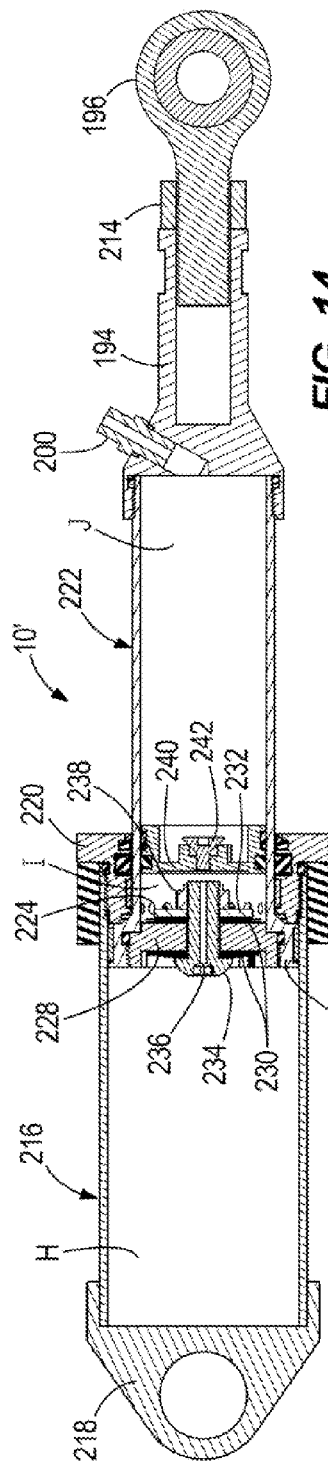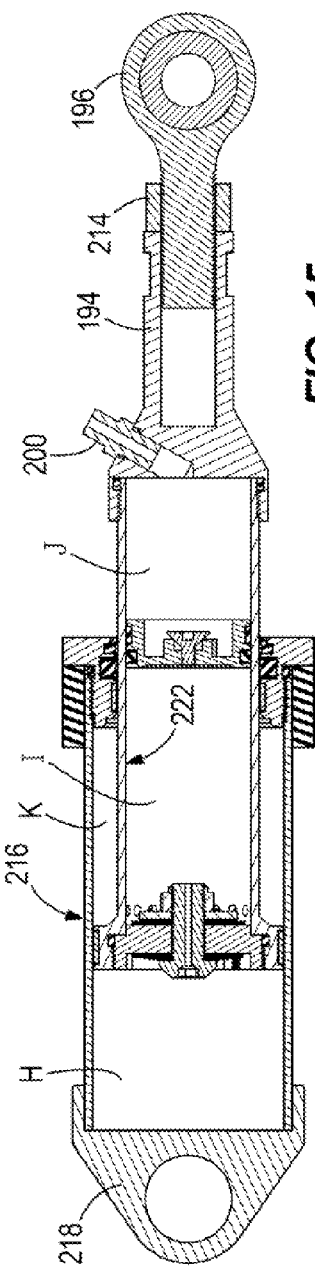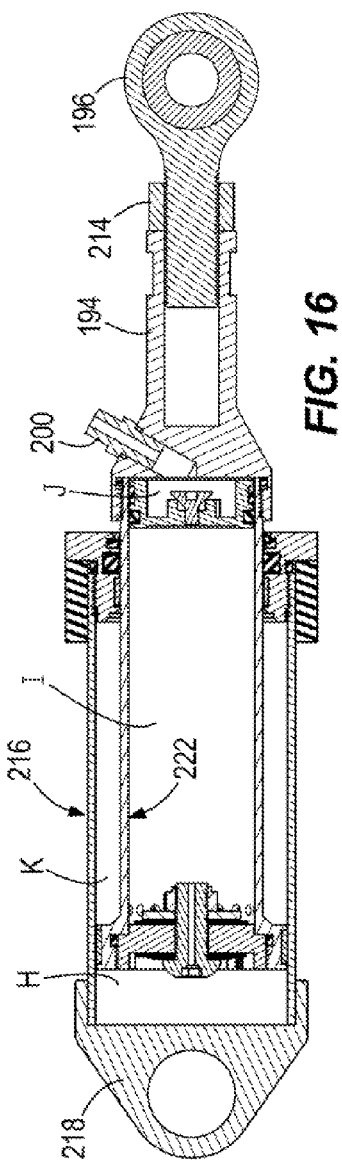

MULTI-STAGE TELESCOPIC SHOCK ABSORBER

CROSS REFERENCE TO RELATED APPLICATION

This application relates to and claims priority from U.S. Provisional Application Ser. No. 61/256,800, filed on Oct. 30, 2009, which is fully incorporated herein by reference.

FIELD

The present disclosure relates to suspension elements and shock absorbers, such as used in vehicle suspension systems, to dampen and smooth unwanted vibrations and shocks that occur as the vehicle travels over varying terrain.

SUMMARY

The present inventors have recognized that the prior art does not adequately provide the suspension reaction forces desired when shock forces are applied to the vehicle component to which the suspension element or shock absorber is mounted. The present inventors endeavored to provide a multi-stage suspension element or shock absorber which provides spring and damping characteristics that will enhance the ride comfort, handling and ground holding capability of the vehicle when subjected to changeable driving conditions.

In one example disclosed herein, a multi-stage telescopic suspension element includes first and second tubular shock bodies serially interconnected together to provide telescopic movement relative to one another. The shock bodies include a piston arrangement slidably mounted therein to define a number of chambers each containing at least one of damping and spring elements for enabling damping of shock forces applied to the suspension element. One of the shock bodies has an end provided with a piston which is slidably mounted with respect to the other of the shock bodies, and an internal floating piston is slidably mounted with respect to the one of the shock bodies.

The multi-stage telescopic suspension element includes a first tubular shock having one end which is closed by a first end cap and an opposite end which is open. A second tubular shock body has one end provided with the piston which is slidably mounted within the first tubular shock body, and an opposite end closed by a second end cap. The internal floating piston is slidably mounted within the second tubular shock body between the piston and the second end cap. A first fluid chamber is defined by the first tubular shock body, the first end cap, the one end of the second tubular shock body and the piston. A second fluid chamber is defined by the second tubular shock body, the one end of the second tubular shock body and the internal floating piston. A spring chamber is defined by the second tubular shock body, the internal floating piston and the second end cap. The second end cap includes an adapter and an end connector which is adjustably mounted relative to the adapter.

In another example disclosed herein, a multi-stage telescopic suspension element includes a plurality of tubular shock bodies serially interconnected to provide telescopic movement relative to one another. The shock bodies include a piston arrangement slidably mounted therein to define a number of chambers each containing at least one of damping and spring elements for enabling damping of shock forces applied to the suspension element.

The multi-stage telescopic suspension element includes a first tubular shock body having one end which is closed by a first end cap and an opposite end which is open. A second tubular shock body has one end provided with a first piston and an opposite end which is open. A third tubular shock body has one end provided with a second piston and an opposite end closed by a second end cap. The one end of the second shock body is slidably mounted within the first shock body, and the one end of the third shock body is slidably mounted within the second shock body. At least a first chamber is defined by the first shock body, the first end cap and the one end of the second shock body. At least a second chamber is defined by the second shock body, the one end of the second shock body and the one end of the third shock body. At least a third chamber is defined by the third shock body, the one end of the third shock body and the second end cap.

The first, second and third chambers each have a first fluid, a second fluid and a third fluid, respectively, and the first and second pistons are provided with valve arrangements for permitting fluid flow therethrough. The open end of the first shock body is in sealed relationship with an outer surface of the second shock body, and an open end of the second shock body is in sealed relationship with an outer surface of the third shock body. A first circumferential passage is defined by the one end of the second shock body, the opposite end of the first shock body, an inner surface of the first shock body and an outer surface of the second shock body. The outer surface of the second shock body is formed with openings therethrough that are in communication with the valve arrangement of the first piston and the first circumferential passage so that fluid is transferable between the first chamber and the first circumferential passage. The one end of the second shock body includes a separator plate located adjacent the first piston on the second shock body for preventing fluid communication between the first and second chambers. A second circumferential passage is defined by the one end of the third shock body, the opposite end of the second shock body, an inner surface of the second shock body and an outer surface of the third shock body. An outer surface of the third shock body is formed with openings therethrough that are in communication with the valve arrangement of the second piston and the second circumferential passage so that fluid is transferable between the second chamber and the second circumferential passage. The valve arrangement of the second piston permits communication of fluid between the second and third chambers.

A first internal floating piston is slidably mounted within the first chamber of the first shock body between the first end cap and the one end of the second shock body. A first spring chamber is defined by the first shock body, the first end cap and the first internal floating piston. The first spring chamber contains a compressible spring medium such as a gas spring. A first damping chamber is defined by the first shock body, the first internal floating piston and the one end of the second shock body. The first damping chamber contains a hydraulic fluid. A second internal floating piston is slidably mounted in the third chamber of the third shock body between the one end of the third shock body and the second end cap. A second spring chamber is defined by the third shock body, the second internal floating piston and the second end cap. The second spring chamber contains a compressible spring medium such as a gas spring. A second damping chamber is defined by the third shock body, the one end of the third shock body and the second internal floating piston. A second damping chamber contains a hydraulic fluid. The second chamber defines a third damping chamber containing hydraulic fluid. The first end cap has a passageway for establishing a charge of gas in the first spring chamber. The second end cap has a passageway for establishing a charge of gas in the second spring chamber.

At least one valve arrangement includes a fastener formed with a hole therethrough which permits communication of fluid between a pair of the chambers. At least the first internal floating piston has a structure which defines a first volume of the first spring chamber when mounted in one position, and defines a second volume of the first spring chamber greater than the first volume when mounted in a second position.

BRIEF DESCRIPTION OF THE DRAWINGS

FIG. 1 is a sectional view of a first exemplary multi-stage telescopic shock absorber in an extended position;

FIG. 2 is a view similar to FIG. 1 showing the shock absorber in a partially compressed position;

FIG. 3 is a view similar to FIG. 2 showing the shock absorber in a near fully compressed position;

FIG. 4 is an exploded sectional view of the three stages of the shock absorber shown in FIGS. 1-3;

FIG. 5 is an exploded elevational view of the three stages of the shock absorber similar to FIG. 4;

FIGS. 11-13 are sectional views of the shock absorber similar to FIGS. 1-3 with certain modifications made thereto; and FIGS. 14-16 are sectional views of a second exemplary shock absorber in respective extended, partially compressed and near fully compressed positions.

DETAILED DESCRIPTION

Figure 6:
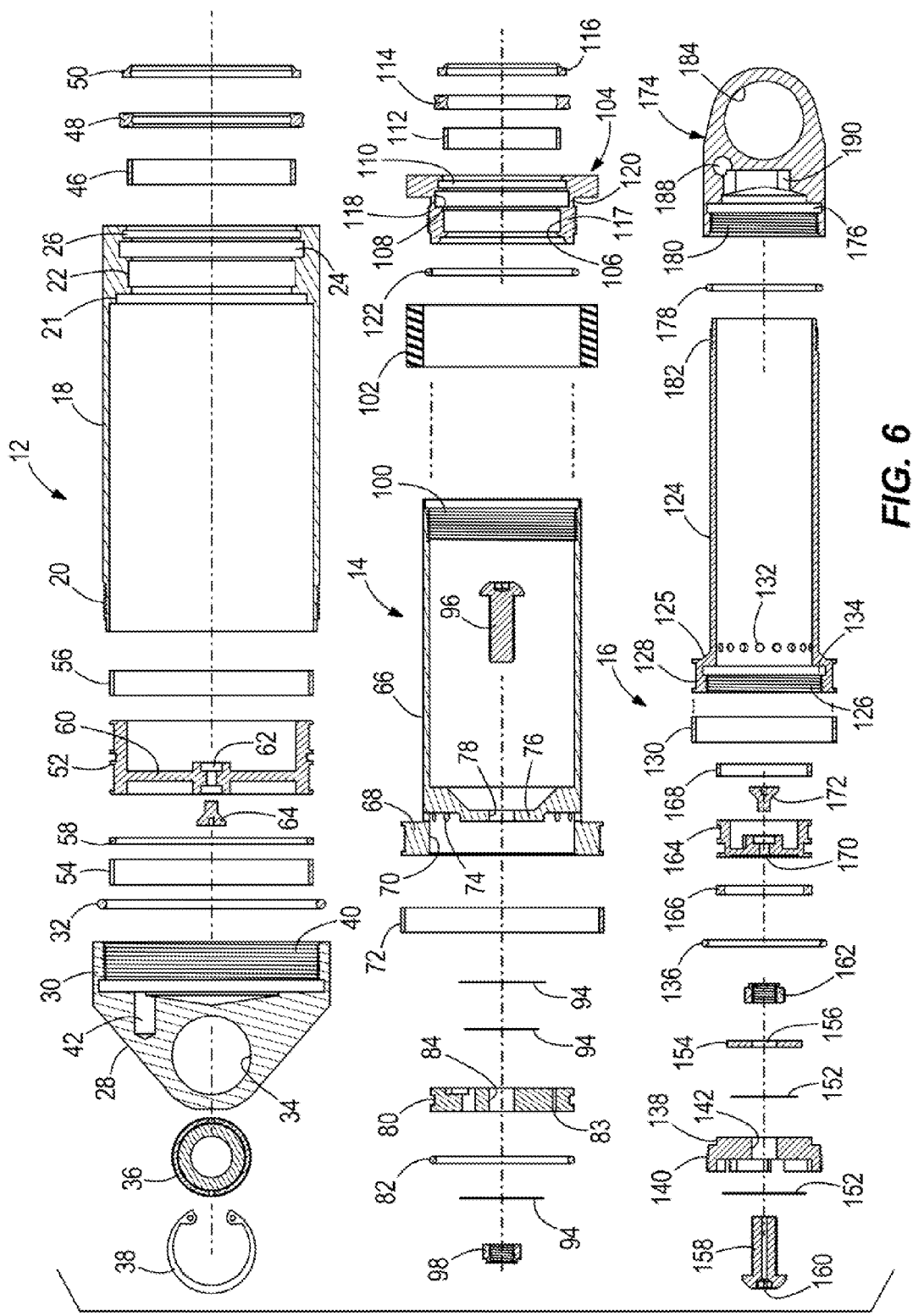
FIG. 6 is an exploded sectional view of all of the components of the shock absorber.

For purposes of promoting an understanding of the principles of the invention, reference will now be made to the examples illustrated in the drawings and described in the following written specification. It is understood that no limitation to the scope of the invention is thereby intended. It is further understood that the present invention includes any alterations and modifications to the illustrated example and includes further applications of the principles of the invention as would normally occur to one skilled in the art to which this invention pertains.

Overview

Referring now to the drawings, the present disclosure describes a multi-stage suspension element in the form of a shock absorber 10 that is particularly useful in, but not limited to, a recreational vehicle, such as a snowmobile or all-terrain vehicle (ATV), which is typically subjected to travel over rough and varying terrain.

As seen in FIGS. 1-5, the shock absorber 10 includes a first stage 12, a second stage 14 and a third stage 16 telescopically interconnected together, and adapted to be positioned in a vehicle suspension for movement between extended and variably compressed positions to absorb or dampen shocks and vibrations during vehicle use.

The exemplary shock absorber 10 includes an arrangement of internal floating pistons, pistons or valving members, chambers and passages for holding hydraulic fluid or gas. The shock absorber 10 illustrated is configured to act as a combination spring and damper, but may also act independently as a spring or damper. Opposite ends of the shock absorber 10 are provided with pivotal connection, end caps which are adapted to be secured, to various support elements such as located on the vehicle suspension. The end caps move closer to each other when a shock force is applied to the shock absorber, and will normally move apart when the shock force is removed and a spring force is provided. Two reaction forces (when configured as a spring and a damper) will result when a shock force is applied as the second stage 14 will nest in the first stage 12, and the third stage 16 will nest in the second stage 14. Relative displacement of the stages 12 and 14 is normally dependent upon gas pressure in the first and third stages 12 and 16, respectively. Hydraulic fluid will flow through the valving pistons when stages 14 and 16 are displaced into stages 12 and 14, respectively. The pistons are provided with valving arrangements that restrict hydraulic fluid flow and generate damping forces dependent upon velocity. Hydraulic fluid passed through the pistons is displaced into circumferential passages and fill volumes of certain damping chambers that reside between the internal floating pistons and the pistons to enable movement thereof. The floating pistons have gas charges (or other spring forces) preset in spring chambers on sides opposite the fill volumes such that a restoring force is created as the gas (or spring) is compressed. Upon damping of the applied shock force, the restoring force will enable the stages 12, 14 and 16 to assume their original extended position.

First Exemplary Embodiment

Referring now to FIG. 6, as well as FIGS. 1-5, the first stage 12 of shock absorber 10 is generally constructed of a metal such as aluminum in the form of a hollow, tubular cylindrical shaft 18 defining a first shock body. The shaft 18 has one end provided with external threads 20, and an opposite end 21 formed with a number of adjacently disposed circular recesses 22, 24, and 26. A first closed end cap 28 has a circular recess 30 for receiving and retaining a sealing O-ring 32 therein, and a hole 34 for receiving a ball joint 36 retained in place by a snap ring 38. The end cap 28 has internal threads 40 that enable the end cap 28 to be screwthreaded onto threads 20 and sealed by means of the O-ring 32 on shaft 18. The end cap 28 also has a passageway 42 that opens into the interior of shaft 18 and is in communication with a fill valve 44 (FIG. 5). Opposite the closed end cap 28, the circular recesses 22, 24 and 26, respectively, receive and retain a wear ring 46, a quad ring 48 and a wiper 50. A first internal floating piston 52 has an external grooved surface provided with a pair of wear rings 54, 56 positioned on opposite sides of a fluid-sealing quad ring 58. The internal floating piston 52 has an internal transverse wall 60 formed with a throughhole 62, one side of which receives a first plug screw 64. The internal floating piston 52 is mounted for sliding and sealed movement back and forth along the inner surface of shaft 18.

The second stage 14 of shock absorber 10 is also preferably constructed of aluminum and includes a hollow, tubular cylindrical shaft 66 defining a second shock body. The shaft 66 has a diameter which is smaller than the diameter of shaft 18, and has a radially enlarged end 68 that defines a recess 70 that is provided externally with a wear ring 72 thereon. An outer surface of shaft 66 is formed with a number of openings 74, and a separator plate 76 with a central hole 78 extends across the interior of shaft 66. A first piston or valving element 80 has an O-ring 82 externally retained thereon and is formed therethrough with a bypass hole 83 and a central hole 84 which is aligned with central hole 78 in separator plate 76.

Figure 7:
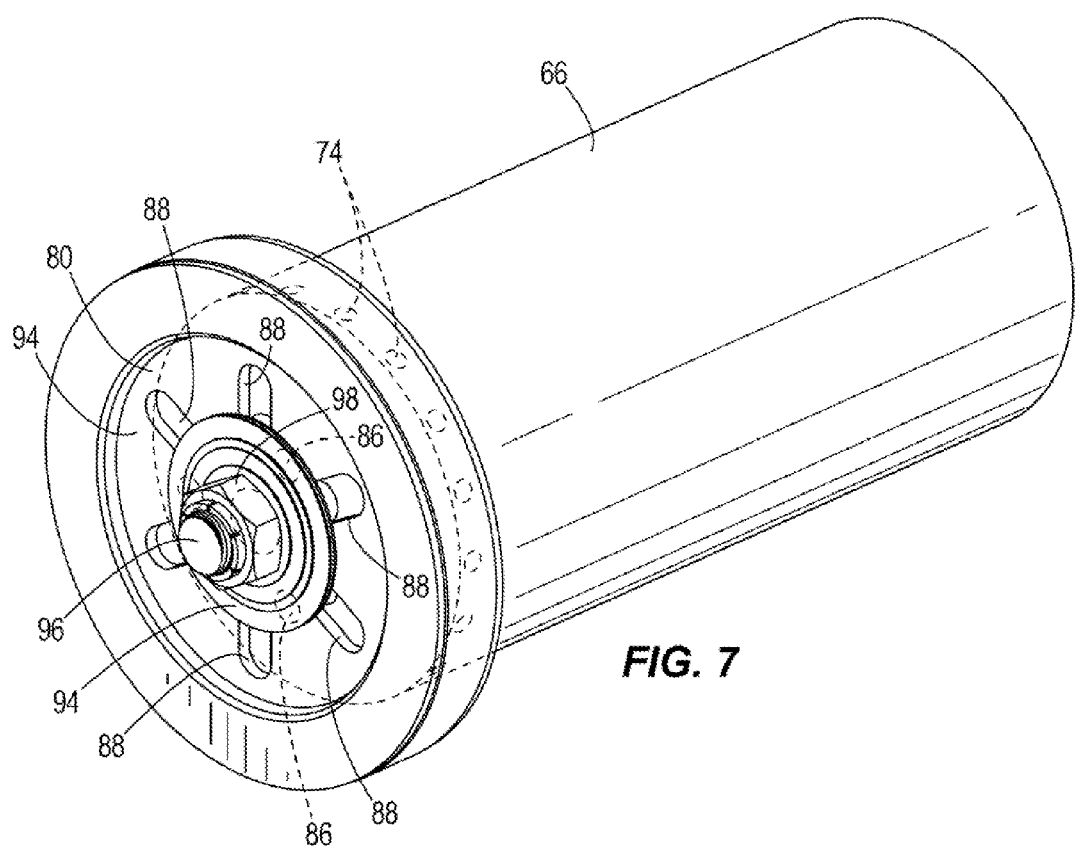
FIG. 7 is a partial perspective view of the second stage of the shock absorber showing a front side of the first piston having valving washers.
Figure 8:
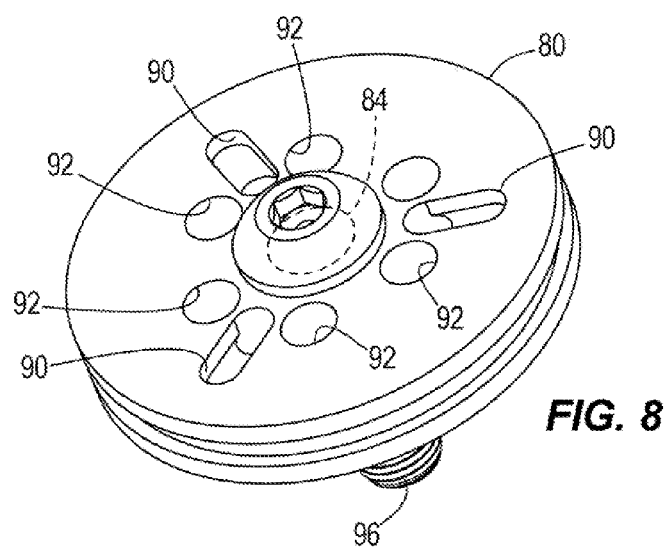
FIG. 8 is a perspective view of a rear side of the first piston without valving washers.

As seen in FIG. 7, one side of piston 80 is formed with several circular holes 86 and several slotted channels 88. As seen in FIG. 8, the other side of piston 80 is formed with several slotted channels 90 in communication with holes 86 and several circular holes 92 in communication with slotted channels 88. Each side of piston 80 includes a number of, flexible washers or disks 94 which typically cover at least some of the holes 86, 92 and channels 88, 90. The washers 94 are constructed to flex when a predetermined amount of pressure is applied thereto and, as will be appreciated hereafter, are used to control fluid flow during compression and extension of shock absorber 10. Washers 94 may vary in thickness and diameter to provide differing metering characteristics. The piston 80 with the washers 94 on each side thereof is positioned in the recess 70, and retained in the enlarged end 68 of shaft 66 adjacent separator plate 76 by a bolt 96 which is passed through holes 78 and 84 and receives lock nut 98 thereon. Together, the openings 74, holes 86, 92, the channels 88, 90 and the washers 94 define a valve arrangement for variably controlling fluid flow in the shock absorber 10.

Opposite the radially enlarged end 68, the shaft 66 is provided with internal threads 100, and a rubber sleeve or bumper 102 is positioned externally on shaft 66 outside threads 100. A cap 104 with a central opening is formed with adjacent internal recesses 106, 108, 110 for respectively receiving a wear ring 112, a quad ring 114, and a wiper 116. A laterally extending portion 117 of cap 104 has threads 118 formed externally thereon along with a groove 120 for receiving an O-ring 122. Cap 104 is screwthreaded into threads 100 of shaft 66 so that a radially enlarged portion of cap 104 abuts an outer end of rubber bumper 102 and an O-ring 122 provides a seal between the cap 104 and the shaft 66. The radially enlarged end 68 of shaft 66 with its external wear rings 72 and internal piston 80 is configured for sliding movement back and forth along the inner surface of shaft 18. The outer surface of shaft 66 slides back and forth along wear ring 46, quad ring 48 and wiper 50 so that it is in sealed relationship with the shaft 18.

The third stage 16 of shock absorber 10 is preferably constructed of aluminum and includes a hollow, tubular cylindrical shaft 124 defining a third shock body which is slidable through the cap 104. The shaft 124 has a diameter which is smaller than the diameter of shaft 66, and has a radially enlarged end 125 that is provided internally with threads 126 and externally with a groove 128 for receiving a wear ring 130. An outer surface of shaft 124 is formed with a series of openings 132 and an internal recess 134 is provided for retaining an O-ring 136. A second piston or valving element 138 has external threads 140 that are received in the internal threads 126 of shaft 124, and is formed with a central hole 142.

Figure 9:
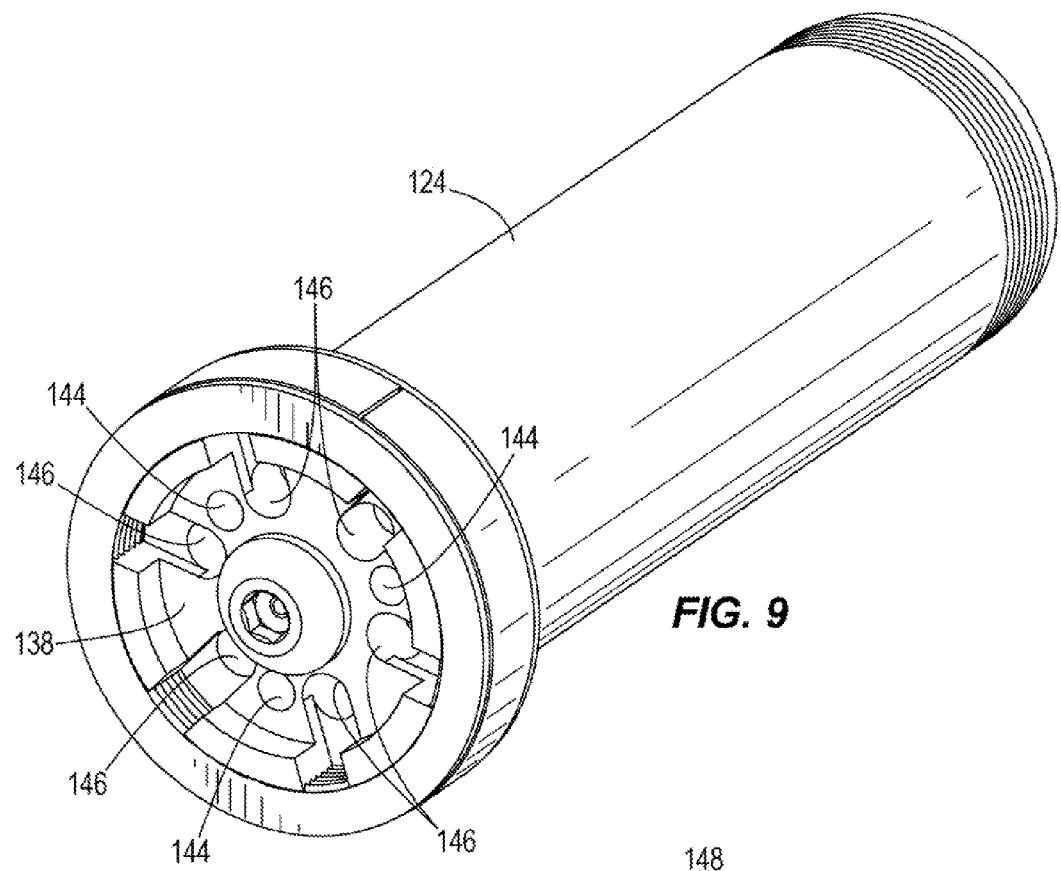
FIG. 9 is a perspective view of the third stage of the shock absorber showing a front side of a second piston without valving washers.
Figure 10:
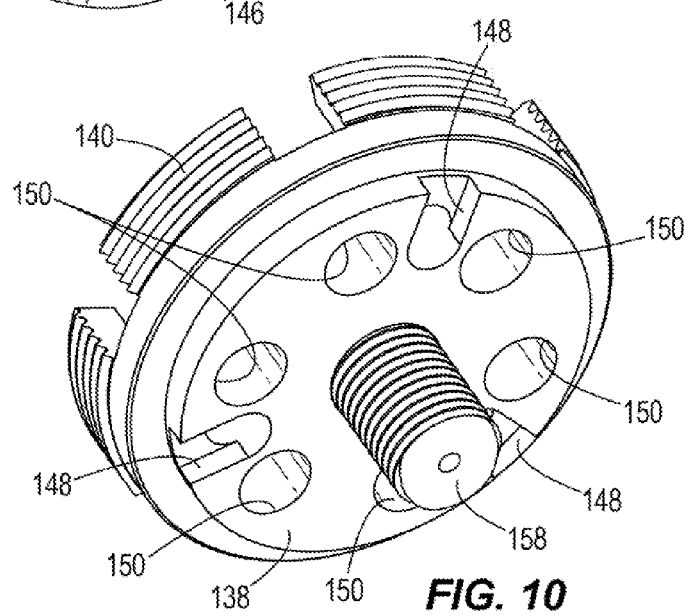
FIG. 10 is a perspective view of a rear side of the second piston without valving washers.

As seen in FIG. 9, one side of piston 138 is formed with several circular holes 144 and several slotted channels 146. As seen in FIG. 10, the other side of piston 138 is formed with several slotted channels 148 in communication with holes 144 and several circular holes 150 in communication with slotted channels 146. Each side of piston 138 includes flexible washers or disks 152 which are comparable in structure and function to disks 94. A backup washer 154 is placed against the washer 152 on, the other side of the piston 138, and has a central hole 156 aligned with central hole 142. A bolt 158 with a bypass hole 160 formed longitudinally therethrough for metering fluid is passed through the disks 152 and the holes 142 and 156, and threaded into a lock nut 162 positioned against the backup washer 154. Together openings 132, holes 144, 150, channels 146, 148, washers 152 and bypass hole 160 define a valve arrangement for controlling fluid flow through the shock absorber 10.

A second internal floating piston 164 is provided externally with a quad ring 166 and a wear ring 168. The internal floating piston 164 has a throughhole 170, one side of which receives a plug screw 172. Opposite the radially enlarged end 125, a second closed end cap 174 has an internal recess 176 for receiving a sealing O-ring 178 therein, and internal threads 180 which are screwthreaded onto the external threads 182 on shaft 124. End cap 174 is formed with a hole 184 similar to hole 34 for providing a pivotal end connection for the shock absorber 10 on the vehicle suspension. End cap 174 also is provided with a fill valve 186 (FIG. 5) in communication with passageways 188 and 190 that open into the interior of shaft 124. The radially enlarged end 125 of shaft 124 is configured for sliding movement back and forth along the inner surface of shaft 66. The internal floating piston 164 is mounted for sliding and sealed movement back and forth along the inner surface of shaft 124. The outer surface of shaft 124 slides back and forth along wear ring 112, quad ring 114, and wiper 116.

In a typical use of the exemplary embodiment described above, the three stages 12, 14, 16 of the shock absorber 10 are slidably interconnected as shown in FIGS. 1-3. With end cap 28 unscrewed from shaft 18, and the open end of shaft 18 oriented upwardly, the internal floating piston 52 with plug screw 64 removed is positioned within shaft 18. The internal floating piston 52 will have a frictional fit with the inner surface of the shaft 18. A viscous damping fluid in the form of a hydraulic fluid or oil is poured into the open end of vertically oriented shaft 18 such that oil will pass via throughhole 62 into a first damping chamber A defined by the shock body 18, internal floating piston 52 and the piston 80. Plug screw 64 is inserted in throughhole 62, and any excess oil is removed from the interior of shaft 18 to the left of internal floating piston 52. End cap 28 is screwthreaded and sealed onto the threads 20 of shaft so that a first, spring chamber B is defined by the shock body 18, the end cap 28 and the internal floating piston 52.

With end cap 174 unscrewed from shaft 124 and the open end of shaft 124 oriented upwardly, the internal floating piston 164 with plug screw 172 removed is positioned within shaft 124. The internal floating piston 164 will have a frictional fit with the inner surface of shaft 124. A damping fluid in the form of a hydraulic fluid or oil is poured into the open end of vertically oriented shaft 124 such that the oil will pass via throughhole 170 into a second damping chamber C defined by the shock body 124, the internal floating piston 164 and the piston 138. Plug screw 172 is inserted in throughhole 170, and any excess oil is removed from the interior of shaft 124 to the right of internal fluid piston 164. End cap 174 is screwthreaded and sealed onto threads 182 of shaft 124 so that a second spring chamber D is defined by the shock body 124, the internal floating piston 164, and the end cap 174. A third damping chamber E is defined by the shock body 66, the separator plate 76 and the piston 138 in the end 128 of the shaft 124. The third damping chamber E is in communication with oil in damping chamber C by virtue of the valve arrangement in piston 138 and the bypass hole 160 in bolt 158. Separator plate 76 with bolt 96 inserted therethrough prevents any communication between damping chambers A and E. In addition, upon compression of shock absorber 10 as seen in FIGS. 2 and 3, a first circumferential damping passage F is defined by the inner surface and the end 21 of shaft 18, and the outer surface and the end 68 of shaft 66. Damping passage F is in communication with openings 74 formed in shaft 66 and oil in damping chamber A which can pass through piston 80. A second circumferential damping passage G is defined by the inner surface of shaft 66 and the outer surface and end 128 of shaft 124 and the portion 117 of cap 104. Damping passage G is in communication with the openings 132 formed in shaft 124 and oil in damping chamber E will pass through piston 138. Spring chambers B and D are charged appropriately via fill valves 44, 186 with a compressible medium in the form of a gas spring, such as a $CO_2$, air or nitrogen, to provide a desired return or rebound force following compression and retraction of the second and third stages 14 and 16, respectively.

FIG. 1 illustrates a shock absorber in a fully extended position without any shock force applied thereto. FIGS. 2 and 3 depict the successive compression and damping of the second and third stages 14 and 16 when a shock force is applied to the shock absorber 10. During compression, the piston 80 slides to the left within the shock body 18 against the oil in damping chamber A causing internal floating piston 52 to move towards end cap 28 and compressing gas in the spring chamber B. As the piston 80 slides to the left, some of the oil in damping chamber A is transferred through the valve arrangement for piston 80 including the openings 74 of shaft 66 and flows into the circumferential passage F. As piston 138 moves to the left within the shock body 66, some of the oil in damping chamber E passes through the valve arrangement for piston 138 including the bypass hole 160 into damping chamber C pushing internal floating piston 164 to the right towards end cap 174 and compressing the gas in spring chamber D. Simultaneously, some of the oil in damping chamber E also flows through the openings 132 on shaft 124 and into circumferential passage G. When the shock force has been dampened, the shock absorber 10 assumes the substantially fully compressed position depicted in FIG. 3. As can be seen in FIGS. 1-3, the pistons 80, 138 are held and maintained in continuous spaced apart relationship, and prevented from making contact with each other by means of the separator plate 76. It should be appreciated that metal-to-metal contact with the end 21 of shock body 18 and the cap 104 of shock body 66 is prevented by the rubber bumper 102.

A rebound action follows the aforementioned compression of the shock absorber 10. During the rebound action, the gas compressed in spring chambers B and D will resiliently expand against internal floating pistons 52 and 164 causing the shock absorber to extend and return to the initial precompressed condition shown in FIG. 1. As was the case during compression, oil within the shock absorber will pass in a reverse direction through the pistons 80 and 138 as well as the openings 74 and 132 for return to damping chambers A, C and E.

It should be understood that damping in the shock absorber 10 may be changed such as by providing different valve arrangements for the pistons 80 and 138, by varying the diameter of the hole 160 in bolt 158 or by altering the number and size of the openings 74 and 132 in the shafts 66 and 124, respectively. The greater the degree to which the flow of damping fluid is restricted, the greater the damping forces that are provided by the shock absorber 10. Accordingly, a "soft" stroking action is afforded when the flow of damping fluid in the shock absorber is relatively unrestricted. By contrast, a "stiffer" stroking action is obtained when there is increased restriction in the flow of damping fluid in the shock absorber 10.

Similarly, it should be appreciated that the rebound action in the shock absorber 10 may be constructed to provide different return forces by varying the preset gas pressures in the spring chambers B and D. If desired, the volume of spring chamber B may be enlarged such as by reversing the orientation of the interior floating piston 52 within shock body 18. The enlargement of spring chamber B has been shown to provide a more linear spring rate for the rebound action of the shock absorber 10. It should also be understood that either or both of the spring chambers 13 and D could be alternatively charged by using one or more remote reservoirs that could include an internal floating piston. Although the exemplary embodiment utilizes a gas spring in each of the spring chambers B and D, the shock absorber 10 could also be suitably configured with a mechanical, electrical, magnetic or alternative spring.

It is contemplated that the three stage shock absorber 10 described herein may have more or less stages and that the lengths and diameters of the stages may be varied in size as desired for a particular application. Likewise, the shock absorber 10 may be constructed with fewer or greater than the internal floating pistons 52, 164, the pistons 80 and 138, the chambers A, B, C, D, E and the passages F and G as described above. If desired, the shock absorber 10 may be constructed without the internal floating pistons 52 and 164 thereby creating chambers between the piston 80 and the end cap 28, and the piston 138 and the end cap 174 which may be filled with oil and gas thereby creating an emulsion shock absorber.

FIGS. 11-13 are similar in structure and function to the first exemplary embodiment described above except for the following modifications which are made to ease machining and assembly and improve versatility of the shock absorber 10. Separator plate 76 which is formed integrally across the interior of shaft 66 adjacent end 68, as shown in FIGS. 1-6, is replaced by a separate and non-integral separator plate 76a having a central hole 78a. Bolt 96 passes through hole 78a and hole 84 of piston 80 and receives lock nut 98 to maintain separator plate 76a tightly against washer 94 and piston 80. When fixed in place, the separator plate 76a has a peripheral surface which is sealed against the interior surface of hollow tubular shaft 66 by an O-ring 192 positioned in a groove formed in the peripheral surface.

The end cap 174 shown in FIGS. 1-6 is replaced by a two piece assembly comprised of an adapter 194 and an end connector 196. Adapter 194 is grooved for receiving a sealing O-ring 178a therein, and is provided on an inner end thereof with threads 198 which are screwthreaded onto external threads 182 of shaft 124. Adapter 194 is formed with a fill valve 200 having a passageway 202 that opens into the interior of shaft 124 to selectively charge chamber D with a compressible medium. Adapter 194 is further formed with an internal recess 204 that is internally threaded to receive threads 206 on an extension 208 of the end connector 196. The end connector 196 is provided with a ball joint 210 and has a hole 212 for providing a pivotal end connection for the shock absorber 10. The end connector 196 can vary in size and can be threadably adjusted as desired to change the length of the shock absorber 10 without disassembly thereof. A lock nut 214 is threadably engaged on the extension 208 to lock the end connector 196 relative to the adapter 194.

Second Exemplary Embodiment

Referring now to FIGS. 14-16, the present disclosure further contemplates a two stage shock absorber 10' having a hollow tubular cylindrical shaft 216 defining a first shock body. One end of shaft 216 has a closed end cap 218 and an opposite end of shaft 216 has an open cap 220 for slidably receiving a hollow tubular cylindrical shaft 222 defining a second shock body. The shaft 222 has an outer surface formed with a series of openings 224, and has a radially enlarged end 226 provided with a piston or valve element 228. Opposite sides of the piston 228 include flexible washers and disks 230 and a backup washer 232 which are comparable in structure and function to disks 94 and 152. A bolt 234 with a bypass hole 236 formed longitudinally therethrough for metering fluid is passed through piston 228, disks 230 and washer 232 and threaded into a lock nut 238. An internal floating piston 240 having a plug screw 242 is mounted for sliding and sealed movement back and forth along the inner surface of shaft 222. Opposite the radially enlarged end 226, the shaft 222 has an open end 244 closed by a second end cap defined by the adapter 194 and end connector 196 as described above.

A first fluid damping chamber H is defined by the shock body 216, the end cap 218 and the end 226 of the shock body 222 having piston 228 mounted therein. A second fluid damping chamber I is defined by the shock body 222, the end 226 of the shock body 222 having piston 228 mounted therein and internal floating piston 240. A spring chamber J is defined by the shock body 222, the internal floating piston 240 and the second end cap defined by adapter 194 and end connector 196. As seen in FIGS. 15 and 16, a circumferential damping passage K is defined by the inner surface and end cap 220 of shock body 216 and the outer surface and end 226 of the shock body 222. Damping passage K is in communication with openings 224 formed in shock body 222 and damping fluid, such as oil, provided in damping chamber H which can pass through piston 228 and washers 230. Damping chamber I is designed to receive damping fluid, such as oil, and spring chamber J is charged appropriately via fill valve 200 with a compressible medium in the form of a gas spring, such as $CO_2$, air or nitrogen, to provide a desired return or rebound force following compression and retraction of the two stage shock absorber 10'.

FIG. 14 illustrates shock absorber 10' in a fully extended position without any shock force applied thereto. FIGS. 15 and 16 depict the successive compression and damping when a shock force is applied to the shock absorber 10'. During compression, the piston 228 slides to the left within the shock body 216 against the oil in damping chamber H. As the piston 228 slides to the left, some of the oil in damping chamber H is transferred through the valve arrangement for piston 228 including the openings 224 of shock body 222 and flows into circumferential damping passage K. Simultaneously, some of the oil in damping chamber H passes through the piston 228 including the bypass hole 236 into damping chamber I pushing internal floating piston 240 to the right towards adapter 194 and compressing the gas in spring chamber J. When the shock force has been dampened, the shock absorber 10' assumes the substantially fully compressed piston depicted in FIG. 16.

A rebound action follows the aforementioned compression of shock absorber 10'. During the rebound action, gas in spring chamber J will resiliently expand against internal floating piston 240 causing the shock absorber 10' to extend and return to the condition shown in FIG. 14. Oil within the shock absorber 10' will pass in a reverse direction from damping chamber I and passage K through the piston 228 and openings 224 for return to damping chamber H.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims, if they have structural elements that do not differ from the literal language of the claims, or if they include equivalent structural elements in substantial differences from the literal language of the claims.

Various alternatives and embodiments are contemplated as being within the scope of the following claims, particularly pointing out and distinctly claiming the subject matter regarded as the invention.

What is claimed is:

1. A multi-stage telescopic suspension element comprising:
    a plurality of tubular shock bodies serially interconnected to provide telescopic movement relative to one another;
    wherein the shock bodies include a piston arrangement slidably mounted therein to define a number of chambers each containing at least one of damping and spring elements for enabling, damping of shock forces applied to the suspension element;
    a first tubular shock body having one end which is closed by a first end cap and an opposite end which is open;
    a second tubular shock body having one end provided with a first piston and an opposite end which is open;
    a third tubular shock body having one end provided with a second piston and an opposite end closed by a second end cap;
    the one end of the second shock body being slidably mounted with respect to the first shock body and the one end of the third shock body being slidably mounted with respect to the second shock body;
    at least a first chamber being defined by the first shock body, the first end cap and the one end of the second shock body;
    at least a second chamber being defined by the second shock body, the one end of the second shock body and the one end of the third shock body; and
    at least a third chamber being defined by the third shock body, the one end of the third shock body and the second end cap;
    wherein the first, second and third chambers each contain a first fluid, a second fluid and a third fluid, respectively, and wherein the first and second pistons are provided with valve arrangements for permitting fluid flow therethrough;
    wherein a first circumferential passage is defined by the one end of the second shock body, the opposite end of the first shock body, an inner surface of the first shock body and an outer surface of the second shock body; and
    wherein the outer surface of the second shock body is formed with openings therethrough that are in communication with the valve arrangement of the first piston and the first circumferential passage so that fluid is transferable between the first chamber and the first circumferential passage.

2. The suspension element of claim 1, wherein a second circumferential passage is defined by the one end of the third shock body, the opposite end of the second shock body, an inner surface of the second shock body and an outer surface of the third shock body.

3. A multi-stage telescopic suspension element comprising:
    a plurality of tubular shock bodies serially interconnected to provide telescopic movement relative to one another;
    wherein the shock bodies include a piston arrangement slidably mounted therein to define a number of chambers each containing at least one of damping and spring elements for enabling damping of shock forces applied to the suspension element;
    a first tubular shock body having one end which is closed by a first end cap and an opposite end which is open;

a second tubular shock body having one end provided with a first piston and an opposite end which is open;
a third tubular shock body having one end provided with a second piston and an opposite end closed by a second end cap;
the one end of the second shock body being slidably mounted with respect to the first shock body and the one end of the third shock body being slidably mounted with respect to the second shock body;
at least a first chamber being defined by the first shock body, the first end cap and the one end of the second shock body;
at least a second chamber being defined by the second shock body, the one end of the second shock body and the one end of the third shock body; and
at least a third chamber being defined by the third shock body, the one end of the third shock body and the second end cap;
wherein the one end of the second shock body includes a separator plate located adjacent the first piston on the second shock body for preventing communication between the first and second chambers.

4. The suspension element of claim 3, wherein the first, second and third chambers each contain a first fluid, a second fluid and a third fluid, respectively, and wherein the first and second pistons are provided with valve arrangements for permitting fluid flow therethrough.

5. The suspension element of claim 4, wherein a first circumferential passage is defined by the one end of the second shock body, the opposite end of the first shock body, an inner surface of the first shock body and an outer surface of the second shock body.

6. The suspension element of claim 3, wherein the open end of the first shock body is in sealed relationship with a surface of the second shock body.

7. The suspension element of claim 3, wherein the open end of the second shock body is in sealed relationship with an outer surface of the third shock body.

8. A multi-stage telescopic suspension element comprising:
a plurality of tubular shock bodies serially interconnected, to provide telescopic movement relative to one another;
wherein the shock bodies include a piston arrangement slidably mounted therein to define a number of chambers each containing at least one of damping and spring elements for enabling damping of shock forces applied to the suspension element;
a first tubular shock body having one end which is closed by a first end cap and an opposite end which is open;
a second tubular shock body having one end provided with a first piston and an opposite end which is open;
a third tubular shock body having one end provided with a second piston and an opposite end closed by a second end cap;
the one end of the second shock body being slidably mounted with respect to the first shock body and the one end of the third shock body being slidably mounted with respect to the second shock body;
at least a first chamber being defined by the first shock body, the first, end cap and the one end of the second shock body;
at least a second chamber being defined by the second shock body, the one end of the second shock body and the one end of the third shock body; and
at least a third chamber being defined by the third shock body, the one end of the third shock body and the second end cap;
wherein the first, second and third chambers each contain a first fluid, a second fluid and a third fluid, respectively, and wherein the first and second pistons are provided with valve arrangements for permitting fluid flow therethrough;
wherein a circumferential passage is defined by the one end of the third shock body, the opposite end of the second shock body, an inner surface of the second shock body and an outer surface of the third shock body; and
wherein the outer surface of the third shock body is formed with openings therethrough that are in communication with the valve arrangement of the second piston and the circumferential passage so that fluid is transferable between the second chamber and the circumferential passage.

9. A multi-stage telescopic suspension element comprising:
a plurality of tubular shock bodies serially interconnected to provide telescopic movement relative to one another;
wherein the shock bodies include a piston arrangement slidably mounted therein to define a number of chambers each containing at least one of damping and spring elements for enabling damping of shock forces applied to the suspension element;
a first tubular shock body having one end which is closed by a first end cap and an opposite end winch is open;
a second tubular shock body having one end provided with a first piston and an opposite end which is open;
a third tubular shock body having one end provided with a second piston and an opposite end dosed by a second end cap;
the one end of the second shock body being slidably mounted with respect to the first shock body and the one end of the third shock body being slidably mounted with respect to the second shock body;
at least a first chamber being defined by the first shock body, the first end cap and the one end of the second shock body;
at least a second chamber being defined by the second shock body, the one end of the second shock body and the one end of the third shock body; and
at least a third chamber being defined by the third shock body, the one end of the third shock body and the second end cap;
wherein the first, second and third chambers each contain a first fluid, a second fluid and a third fluid, respectively, and wherein the first and second pistons are provided with valve arrangements for permitting fluid flow therethrough;
wherein the valve arrangement of the second piston permits communication of fluid between the second and third chambers; and
wherein the first piston and the second piston are maintained in continuous spaced apart relationship by separation structure to prevent contact therebetween and to prevent communication between the first and second chambers.

10. A multi-stage telescopic, suspension element comprising:
a plurality of tubular shock bodies serially interconnected to provide telescopic movement relative to one another;
wherein the shock bodies include a piston arrangement slidably mounted therein to define a number of chambers each containing at least one of damping and spring elements for enabling damping of shock forces applied to the suspension element;

a first tubular shock body having one end which is closed by a first end cap and an opposite end which is open;

a second tubular shock body having one end provided with a first piston and an opposite end which open;

a third tubular shock body having one end provided with a second piston and an opposite end closed by a second end cap;

the one end of the second shock body being slidably mounted with respect to the first shock body and the one end of the third shock body being slidably mounted with respect to the second shock body;

at least a first chamber being defined by the first shock body, the first end cap and the one end of the second shock body;

at least a second chamber being defined by the second shock body, the one end of the second shock body and the one end of the third shock body;

at least a third chamber being defined by the third shock body, the one end of the third shock body and the second end cap;

wherein a firm internal floating piston is slidably mounted within the first chamber of the first shock body between the first end cap and the one end of the second shock body; and wherein the first piston and the second piston are maintained in continuous spaced apart relationship by separation structure to prevent contact therebetween and to prevent communication between the first and second chambers.

11. The suspension element of claim 10, wherein a first spring chamber is defined, by the first shock body, the first end cap and the first internal floating piston.

12. The suspension element of claim 11, wherein at least the first internal floating piston has a structure which defines a first volume of the first spring chamber when mounted in one position, and defines a second volume of the first spring chamber greater than the first volume when mounted in a second position.

13. The suspension element of claim 11, wherein the first spring chamber contains a compressible spring medium.

14. The suspension element of claim 13, wherein the compressible spring medium is a gas.

15. The suspension element of claim 14, wherein the first end cap has a passageway fir establishing a charge of gas in the first spring chamber.

16. The suspension element of claim 10, wherein a first damping chamber is defined by the first shock body, the first internal floating piston and the one end of the second shock body.

17. The suspension element of claim 16, wherein the first damping chamber contains a viscous fluid.

18. A multi-stage telescopic suspension element comprising:
a plurality of tubular shock bodies serially interconnected to provide telescopic movement relative to one another;
wherein the shock bodies include a piston arrangement slidably mounted therein to define a number of chambers each containing at least one of damping and spring elements for enabling damping of shock forces applied to the suspension element;
a first tubular shock body having one end which is closed by a first end cap and an opposite end which is open;
a second tubular shock body having one end provided with a first piston and an opposite end which is open;
a third tubular shock body having one end provided with a second piston and an opposite end closed by a second end cap;
the one end of the second shock body being slidably mounted with respect to the first shock body and the one end of the third shock body being slidably mounted with respect to the second shock body;
at least a first chamber being defined by the first shock body, the first end cap and the one end of the second shock body;
at least a second chamber being defined by the second shock body, the one end of the second shock body and the one end of the third shock body;
at least a third chamber being defined by the third shock body, the one end of the third shock body and the second end cap;
wherein an internal floating piston is slidably mounted in the third chamber of the third shock body between the end of the third shock body and the second end cap; and
wherein the first piston and the second piston are maintained in continuous spaced apart relationship by separation structure to prevent contact therebetween and to prevent communication between the first and second chambers.

19. The suspension element of claim 18, wherein a second spring chamber is defined by the third shock body, the internal floating piston and the second end cap.

20. The suspension element of claim 19, wherein the second spring chamber contains a compressible spring medium.

21. The suspension element of claim 20, wherein the compressible spring medium is a gas.

22. The suspension element of claim 21, wherein the second end cap has a passageway for establishing a charge of gas in the second spring chamber.

23. The suspension element of claim 18, wherein a second damping chamber is defined by the third shock body, the one end of the third shock body and the internal floating piston.

24. The suspension element of claim 23, wherein the second damping chamber contains a hydraulic fluid.

25. The suspension element of claim 23, wherein the second chamber defines a third damping chamber containing hydraulic fluid.

26. A multi-stage telescopic suspension element comprising:
a plurality of tubular shock bodies serially interconnected to provide telescopic movement relative to one another;
wherein the shock bodies include a piston arrangement slidably mounted therein to define a number of chambers each containing at least one of damping and spring elements for enabling damping of shock forces applied to the suspension element;
a first tubular shock body having one end which is closed by a first end cap and an opposite end which is open;
a second tubular shock body having one end provided with a first piston and an opposite end which is open;
a third tubular shock body having one end provided with a second piston and an opposite end closed by a second end cap;
the one end of the second shock body being slidably mounted with respect to the first shock body and the one end of the third shock body being slidably mounted with respect to the second shock body;
at least a first chamber being defined by the first shock body, the first end cap and the one end of the second shock body;
at least a second chamber being defined by the second shock body, the one end of the second shock body and the one end of the third shock body; and at least a third chamber being defined by the third shock body, the one end of the third shock body and the second end cap;

wherein the first, second and third chambers each contain a first fluid, a second fluid and a third fluid, respectively, and wherein the first and second pistons are provided with valve arrangements for permitting fluid flow therethrough;

wherein at least one valve arrangement includes a fastener formed with a hole therethrough which permits communication of fluid between a pair of the chambers; and wherein the first piston and the second piston are maintained in continuous spaced apart relationship by separation structure to prevent contact therebetween and to prevent communication between the first and second chambers.

27. A multi-stage suspension element comprising:

a first tubular shock body having one end which is closed by a first end cap and an opposite end which is open;

a second tubular shock body having one end provided with a first piston having a valve arrangement for permitting fluid flow through the first piston, and an opposite end which is open;

a third tubular shock body having one end provided with a second piston having a valve arrangement for permitting fluid flow through the second piston, and an opposite end closed by a second end cap;

the one end of the second shock body being slidably mounted within the first shock body and the one end of the third shock body being slidably mounted within the second shock body;

a first internal floating piston slidably mounted within the first shock body between the first end cap and the one end of the second shock body;

a second internal floating piston slidably mounted within the third shock body between the one end of the third shock body and the second end cap;

a first damping chamber containing a first damping fluid being defined by the first shock body, the first internal floating piston and the one end of the second shock body;

a second damping chamber containing a second damping fluid being defined by the third shock body, the second internal floating piston and the one end of the third shock body;

a third damping chamber containing a third damping fluid being defined by the second shock body, the one end of the second shock body and the one end of the third shock body;

a first spring chamber containing a gas spring being defined by the first shock body, the first end cap and the first internal floating piston;

a second spring chamber eon taming a gas spring being defined by the third shock body, the second end cap and the second internal floating piston; and wherein the first piston and the second piston are maintained in continuous spaced apart relationship by separation structure to prevent contact therebetween and to prevent communication between the first and third damping chambers.

28. The shock absorber of claim 27, wherein the valve arrangement for the second piston permits flow of the damping fluid between the second and third damping chambers.

* * * * *

UNITED STATES PATENT AND TRADEMARK OFFICE
CERTIFICATE OF CORRECTION

PATENT NO.        : 8,967,346 B2                    Page 1 of 1
APPLICATION NO.   : 12/904696
DATED             : March 3, 2015
INVENTOR(S)       : Stephen E. Polakowski et al.

It is certified that error appears in the above-identified patent and that said Letters Patent is hereby corrected as shown below:

In the Claims:

In claim 8, at column 11, line 60: remove additional "," between the words "first" and "end".

In claim 10, at column 13, line 21: "firm" should read "first".

In claim 11, at column 13, line 31: remove additional "," between the words "defined" and "by".

In claim 27, at column 16, line 21: "eon taming" should read "containing".

Signed and Sealed this
Ninth Day of June, 2015

Michelle K. Lee
*Director of the United States Patent and Trademark Office*